(No Model.) 2 Sheets—Sheet 1.

W. C. McTYEIRE.
MANURE DISTRIBUTER.

No. 379,654. Patented Mar. 20, 1888.

Witnesses:
M. Fowler
E. G. Siggers

Inventor.
William C. McTyeire.
by Andrews & Co.
his Attorneys (No Model.) 2 Sheets—Sheet 2.
W. C. McTYEIRE.
MANURE DISTRIBUTER.
No. 379,654. Patented Mar. 20, 1888.
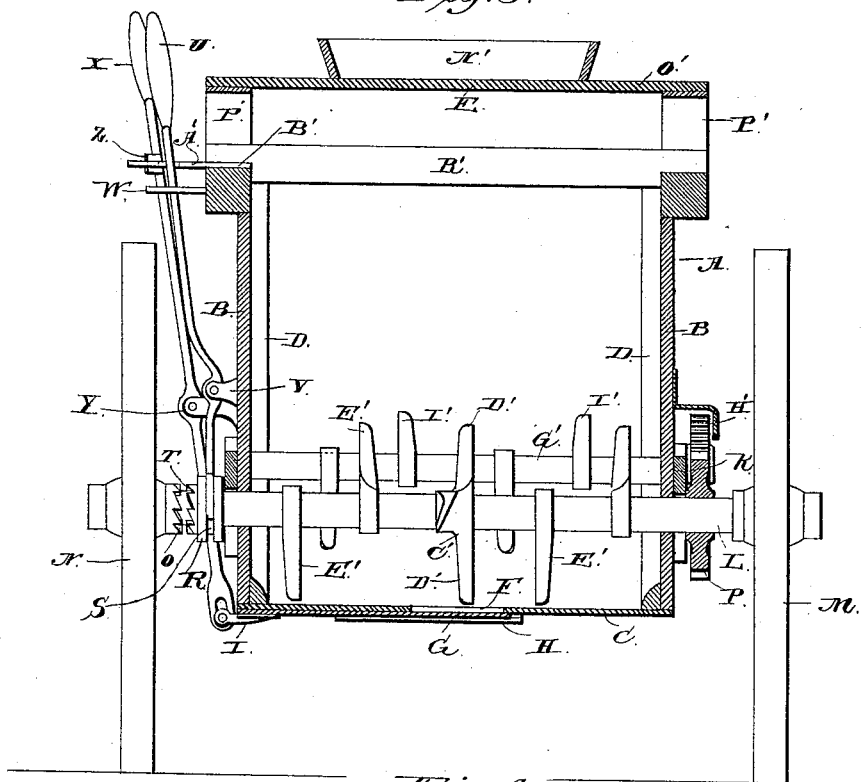
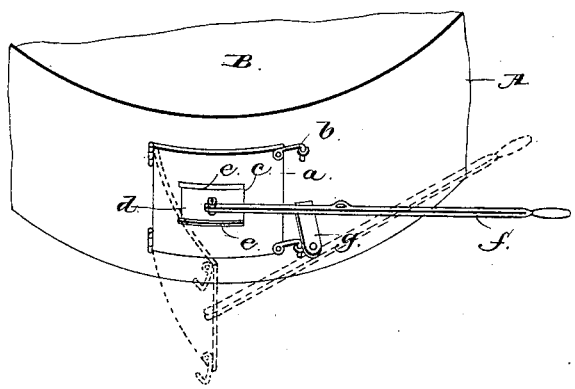
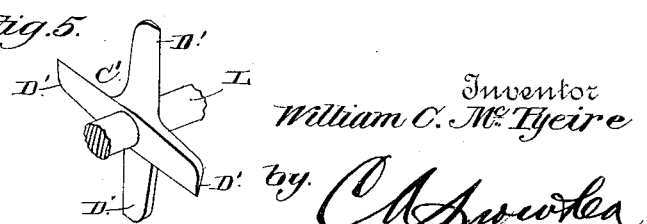
Witnesses
M. Fowler
E. G. Biggers
Inventor
William C. McTyeire
by C. A. Snow & Co.
his Attorneys

UNITED STATES PATENT OFFICE.

WILLIAM COPERS McTYEIRE, OF HATCHECHUBBEE, ALABAMA.

MANURE-DISTRIBUTER.

SPECIFICATION forming part of Letters Patent No. 379,654, dated March 20, 1888.

Application filed October 15, 1887. Serial No. 252,476. (No model.)

*To all whom it may concern:*

Be it known that I, WILLIAM COPERS MC-TYEIRE, a citizen of the United States, residing at Hatchechubbee, in the county of Russell and State of Alabama, have invented a new and useful Improvement in Manure-Distributers, of which the following is a specification.

My invention relates to an improvement in manure-distributers; and it consists in the peculiar construction and combination of devices, that will be more fully set forth hereinafter, and particularly pointed out in the claims.

This invention is an improvement on the machine for which Letters Patent of the United States No. 340,591 were granted to me April 27, 1886.

Figure 1:
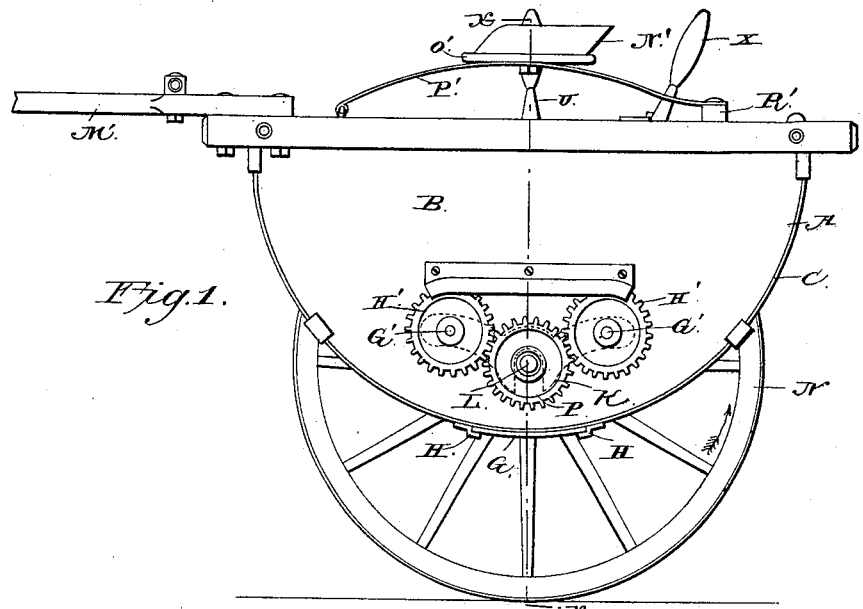
Figure 2:
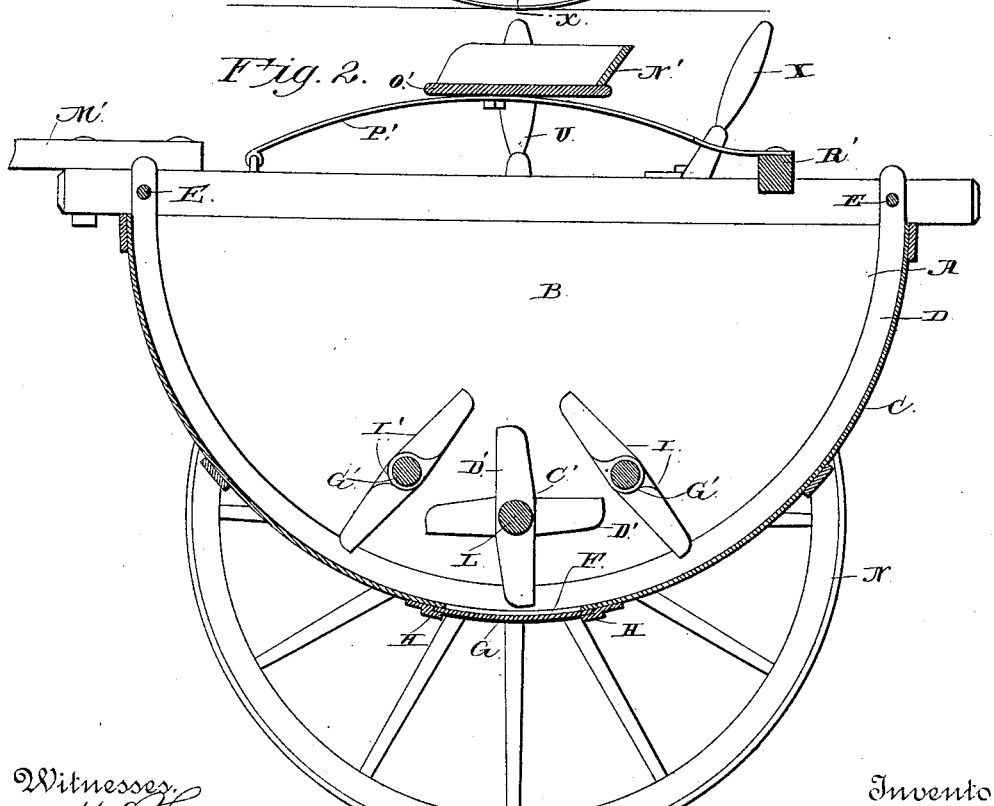

In the accompanying drawings, Figure 1 is a side elevation of my invention with the near wheel removed. Fig. 2 is a vertical longitudinal central sectional view of the same. Fig. 3 is a vertical transverse sectional view taken on the line *x x* of Fig. 1. Fig. 4 is a detail view of a modified form. Fig. 5 is a detached perspective view of one of the stirring and cutting teeth.

A represents the hopper, which is semi-cylindrical in shape and comprises the sides B, which are semicircular in shape and are made of wood, and a sheet-metal plate, C, which forms the bottom of the hopper and has its edges secured to the curved edges of the sides B.

D represents a pair of semicircular battens, which are secured at the corners formed between the plate C and the sides D, the said battens having their inner opposing sides beveled, as shown.

E represents a pair of bolt-rods, which extend transversely through the sides of the hopper at the ends thereof, and through openings in the upper ends of the battens, the said bolt-rods serving to clamp the sides together and prevent them from being forced apart by the weight of the manure in the hopper.

In the bottom of the hopper is an opening, F, which is controlled by a slide, G, that is operated in suitable guides, H, which extend transversely across the bottom of the hopper. From one end of the slide projects an arm, I, which extends outward beyond one side of the hopper. On the outer sides of the hopper, midway between the front and rear ends thereof, and at a suitable distance from the bottom, are secured a pair of curved bearing-plates, K.

L represents the shaft or axle, which extends transversely through the hopper at a suitable distance above the bottom thereof and is journaled in central openings in the bearing-plates K. To one end of the axle is loosely secured a wheel, M, and to the other end thereof is loosely secured a wheel, N, which is provided on the inner end of its hub with a series of notches, O.

P represents a spur-wheel, which is secured rigidly to the axles and bears against the inner end of the hub of wheel M. On the opposite end of the axle is feathered or splined a sliding collar, R, which is provided with a peripheral groove, S, and the outer side of the said collar is provided with clutch-teeth T, which are adapted to engage the notches or recesses O of wheel N when the clutch is moved outward.

U represents a hand-lever, which is fulcrumed on a bracket, V, which projects outward from one side of the hopper. The lower end of this lever is bifurcated and engages the groove in the sliding clutch, and the upper end of the lever projects above the top of the hopper and is guided in a keeper, W, that extends from one side thereof.

X represents a hand-lever, which is fulcrumed on a bracket, Y, that projects from one side of the hopper. The lower end of the said lever X is connected to the arm I of the slide, and the upper end of the said lever is provided on its rear edge with a tooth or flange, Z, which is adapted to engage a series of notches, A', formed in an arm, B', that projects from one side of the hopper, and thereby secure the lever X, and consequently the slide to which it is connected, at any desired adjustment.

To the central portion of the axle is rigidly secured a stirrer, C', provided with a pair of radial arms or blades, D', which have their opposing faces beveled in opposite directions.

E' represents stirring blades or arms, which are secured to the axle at suitable regular distances apart. The faces of the said blades or arms on opposite ends of the axle are inclined or beveled in opposite directions, the said beveled faces of the arms or blades being opposed to each other, as shown, so that when the axle rotates in the direction indicated by the arrow on Fig. 1 the inclined faces of the blades or arms will serve to force the manure in the hopper toward the center thereof, and thereby cause it to be discharged through the opening in the bottom of the hopper, as will be readily understood.

G' represents a pair of shafts, which are arranged transversely in the hopper, and are journaled in openings near the ends of the bearing-plates K. To one end of each of said shafts is rigidly attached a spur-wheel, H', which spur-wheels engage opposite sides of the gear-wheel P, and thereby when the machine moves forward the rotation of the axle is communicated to the shafts, and the latter are caused to revolve in the direction opposite that indicated by the arrow. To each shaft G' is attached a series of blades or arms, I', which are similar to those on the axle and have their beveled or inclined sides on opposite ends of the shaft arranged opposite each other, so that they will be caused to force the manure toward the center of the hopper. The said blades or arms I' are so arranged on the shafts G' as to be out of line with the blades or arms on the axle, and as the said blades or arms I' are caused to rotate in the contrary direction to the blades or arms on the axle, the result is that the manure will be thoroughly disintegrated and cut into small pieces when the machine is in operation.

The rear ends of the shafts or thills M' are bolted to the projecting upper edges of the hopper.

N' represents the seat for the driver, which is arranged on the center of a board, O', that is supported by a pair of semi-elliptic springs, P'. The said springs have their front ends hinged or pivoted to the upper edges of the sides of the hopper, and their rear ends are connected by a cross-bar, R'. By this construction the seat may be folded forward over the rear end of the thills, so as to entirely uncover the upper sides of the hopper, and thereby facilitate the operation of loading the same.

When it is desired that the machine may travel over a field without depositing manure thereon, this may be accomplished by moving the upper end of the handle U outward, so that the lower end of the said hand-lever will move the clutch inward on the axle, and thereby disconnect the same from the wheel N. By adjusting the hand-lever X on the notch-arm B' the slide may be opened or closed to any desired extent, so as to control the quantity of manure distributed by the machine.

In Fig. 4 I illustrate a modified form of my invention, in which I provide the bottom of the hopper with a hinged door, a, which is adapted to be held in a closed position by means of hooks b. In this door is an opening, c, of suitable size, that is adapted to be opened or closed by means of a slide, d, that is guided in ways e on the under side of the door. The slide may be opened or closed by means of a detachable lever, f. When the door a is opened, the manure is discharged from the hopper onto the ground broadcast; but when the door a is closed and the slide d opened the manure is drilled, as will be readily understood. In order to close the door, the lever f is detached from the slide, is fulcrumed on a support, g, that depends from the hopper, its short end is placed under the door, and the operator bears down upon the long end of the lever, thereby closing the door against the weight of the superincumbent mass of manure.

Having thus described my invention, I claim—

1. In a manure-distributer, the combination of the hopper, the axle journaled in the hopper, having the driving-wheels, the stirrer C', secured to said axle and having the radial arms or blades D', with their opposing faces beveled in opposite directions, the shafts G', journaled in the hopper and having the radial arms I', beveled in opposite directions on their opposing faces, the wheel K, secured to the axle, and the wheels H', secured to shafts G' and engaging with the wheel K, as set forth.

2. In a manure-distributer, the combination of the hopper having the discharge-opening in its lower side at the center, the door to close the said opening and having the opening of reduced dimensions, the slide to open or close the said opening in the door, the axle journaled in the hopper, having the driving-wheels, the stirrer C', secured to said axle and having the radial arms or blades D', with their opposing faces beveled in opposite directions, the shafts G', journaled in the hopper and having the radial arms I', beveled in opposite directions on their opposing faces, the gear-wheel K, secured to the axle, and the gear-wheels H', secured to shafts G' and meshing with wheel K, substantially as described.

3. In a manure-distributer, the hopper having the feed-opening in its lower side, the hinged door adapted to cover the said opening, said door having an opening of reduced dimensions, and the slide arranged on the door and adapted to open or close the opening therein, substantially as described.

In testimony that I claim the foregoing as my own I have hereto affixed my signature in presence of two witnesses.

WILLIAM COPERS McTYEIRE.

Witnesses:
E. HERNDON GLENN,
JOHN V. SMITH.